(12) United States Patent
Kühne

(10) Patent No.: US 10,955,910 B2
(45) Date of Patent: Mar. 23, 2021

(54) METHOD FOR OPERATING A VIRTUAL REALITY SYSTEM, AND VIRTUAL REALITY SYSTEM

(71) Applicant: AUDI AG, Ingolstadt (DE)

(72) Inventor: Marcus Kühne, Beilngries (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/617,338

(22) PCT Filed: May 18, 2018

(86) PCT No.: PCT/EP2018/063071
§ 371 (c)(1),
(2) Date: Nov. 26, 2019

(87) PCT Pub. No.: WO2018/219688
PCT Pub. Date: Dec. 6, 2018

(65) Prior Publication Data
US 2020/0409454 A1     Dec. 31, 2020

(30) Foreign Application Priority Data
May 29, 2017 (DE) ...................... 10 2017 208 936.9

(51) Int. Cl.
*G06F 3/01*      (2006.01)
*G06F 3/0484*    (2013.01)
(Continued)

(52) U.S. Cl.
CPC ......... *G06F 3/012* (2013.01); *G02B 27/0093* (2013.01); *G02B 27/0172* (2013.01);
(Continued)

(58) Field of Classification Search
CPC ... G06F 3/012; G06F 3/0484; G02B 27/0093; G02B 27/0172; G02B 27/0179; G02B 2027/0178; G02B 2027/0187
(Continued)

(56) References Cited

U.S. PATENT DOCUMENTS

2002/0099257 A1\*   7/2002   Parker ................ G02B 27/0093
                                                                                   600/27
2003/0043146 A1\*   3/2003   Kitamura ............. H04N 13/398
                                                                                   345/419
(Continued)

FOREIGN PATENT DOCUMENTS

CN          106385587 A     2/2017
DE     102014015871 A1     4/2016
(Continued)

OTHER PUBLICATIONS

German Office Action dated Apr. 20, 2018 from German Patent Application No. 10 2017 208 936.9, 10 pages.
(Continued)

*Primary Examiner* — Chineyere D Wills-Burns
(74) *Attorney, Agent, or Firm* — Staas & Halsey LLP

(57) ABSTRACT

A virtual environment is displayed from a first virtual perspective by a first pair of virtual reality glasses worn by a first person, the first virtual perspective being predefined according to a detected head position and/or head orientation of the first person. The same virtual environment is displayed from the first virtual perspective by a further pair of virtual reality spectacles worn by a further person. The further pair of virtual reality glasses has a total available display area divided into a first display area which displays the virtual environment from the first virtual perspective and a second display area which displays the virtual environment from a further virtual perspective predefined according to a (Continued)

detected head position and/or head orientation of the further person.

10 Claims, 2 Drawing Sheets

(51) Int. Cl.
    *G02B 27/01*     (2006.01)
    *G02B 27/00*     (2006.01)

(52) U.S. Cl.
    CPC ....... *G02B 27/0179* (2013.01); *G06F 3/0484* (2013.01); *G02B 2027/0178* (2013.01); *G02B 2027/0187* (2013.01)

(58) Field of Classification Search
    USPC ......................................................... 345/156
    See application file for complete search history.

(56) References Cited

U.S. PATENT DOCUMENTS

| | | | | |
|---|---|---|---|---|
| 2008/0211771 | A1* | 9/2008 | Richardson | G06F 3/012 345/158 |
| 2012/0172119 | A1* | 7/2012 | Kelly | A63F 13/00 463/31 |
| 2013/0249947 | A1* | 9/2013 | Reitan | G06T 19/006 345/633 |
| 2013/0257686 | A1 | 10/2013 | Baron et al. | |
| 2014/0268356 | A1 | 9/2014 | Bolas et al. | |
| 2014/0362113 | A1* | 12/2014 | Benson | G06T 11/00 345/633 |
| 2017/0282062 | A1* | 10/2017 | Black | A63F 13/323 |
| 2017/0354875 | A1* | 12/2017 | Marks | A63F 13/25 |
| 2018/0074679 | A1* | 3/2018 | Wang | G06F 3/04812 |
| 2018/0275837 | A1* | 9/2018 | Getz | G06F 3/017 |
| 2018/0365882 | A1* | 12/2018 | Croxford | G06T 7/70 |

FOREIGN PATENT DOCUMENTS

| | | |
|---|---|---|
| DE | 102014221608 A1 | 4/2016 |
| DE | 102014019579 A1 | 6/2016 |
| DE | 102017208936.9 | 5/2017 |
| EP | 3196734 A1 | 7/2017 |
| WO | 2016/042862 A1 | 3/2016 |
| WO | PCT/EP2018/063071 | 5/2018 |

OTHER PUBLICATIONS

International Search Report dated Jul. 27, 2018 from International Patent Application No. PCT/EP2018/063071, 6 pages.

English-language translation of the International Preliminary Report on Patentability dated Dec. 5, 2019 from International Patent Application No. PCT/EP2018/063071, 9 pages.

* cited by examiner

METHOD FOR OPERATING A VIRTUAL REALITY SYSTEM, AND VIRTUAL REALITY SYSTEM

CROSS REFERENCE TO RELATED APPLICATIONS

This application is a U.S. national stage of International Application No. PCT/EP2018/063071, filed on May 18, 2018. The International Application claims the priority benefit of German Application No. 10 2017 208 936.9 filed on May 29, 2017. Both the International Application and the German Application are incorporated by reference herein in their entirety.

BACKGROUND

Described herein is a method for operating a virtual reality system and to a virtual reality system.

Virtual reality systems including one or a plurality of pairs of virtual reality glasses for displaying virtual environments and virtual objects arranged therein are already known per se. In this regard, by way of example, German Patent Application No. 10 2014 015 871 A1 describes a pair of virtual reality glasses which can be utilized by a vehicle occupant during a journey in a motor vehicle. In order to prevent the wearer of the pair of virtual reality glasses from becoming nauseous, provision is made for filming the environment of the motor vehicle by using a camera, wherein the filmed motor vehicle environment can be displayed by using the pair of virtual reality glasses put on. In this case, head movements of the wearer of the pair of virtual reality glasses can be detected and taken into account in the display of the contents represented by using the pair of virtual reality glasses.

German Patent Application No. 10 2014 221 608 A1 describes a method for displaying contact analog information in a motor vehicle. In order to prevent a wearer of smartglasses designed for displaying the contact analog information from becoming nauseous, provision is made for interrupting a contact analog display by using the smartglasses while a predefined threshold value is exceeded by the motor vehicle with regard to its movement. By way of example, in the event of relatively rapid cornering, the smartglasses can be controlled in such a way that the display of contact analog information is interrupted during cornering in order to prevent the wearer of the smartglasses from feeling sick.

German Patent Application No. 10 2014 019 579 A1 describes a method for operating a pair of virtual reality glasses in a motor vehicle. By using the pair of virtual reality glasses, firstly a text can be displayed, for example. In order to prevent a wearer of the pair of virtual reality glasses from becoming nauseous during the journey with the motor vehicle, provision is made for detecting data concerning the vehicle movement and for controlling the pair of virtual reality glasses in such a way that, in addition to the text, elements or structures which are animated in accordance with the detected vehicle movement are also displayed by using the pair of virtual reality glasses.

Such pairs of virtual reality glasses can also be used in development and design activities, for example. In this regard, it is possible, by using such pairs of virtual reality glasses, for various people to be able to look at a virtual object that is currently in the development or design stage, for example.

SUMMARY

Described herein is a method for operating a virtual reality system and a virtual reality system which facilitate development and design activities for products.

In the method for operating a virtual reality system, a virtual environment is displayed from a first virtual perspective by using a first pair of virtual reality glasses put on by a first person, wherein the first virtual perspective is predefined depending on a detected head position and/or head orientation of the first person. The method according is distinguished by the fact that the same virtual environment is likewise displayed from the first virtual perspective by using at least one further pair of virtual reality glasses put on by a second person. By the method, it is thus possible that the second person can see the virtual environment from the same virtual perspective as the first person. The first person serves as it were as an image generator who fixes the perspective with regard to the virtual environment and virtual objects arranged therein. For determining or detecting the head position and/or head orientation of the first person, provision can be made, for example, for simply detecting and determining the position and/or orientation of the first pair of virtual reality glasses.

If, by way of example, the first person and the second person are working together on the development of a specific product, then both persons can put on the pairs of virtual reality glasses. A predefined operator control action makes it possible, for example, for the second person to put the pair of virtual reality glasses that he/she has put on into a mode in which, by using the pair of virtual reality glasses, the virtual environment and the virtual object to be examined that is arranged therein are displayed from the same virtual perspective as that from which the virtual environment is displayed for the first person by using the first pair of virtual reality glasses that he/she has put on.

The method is beneficial in particular in development and design activities involving a plurality of persons. The persons can cause themselves to be placed into the respective virtual perspective of the other persons. In this regard, it is possible, for example, for a virtual environment to be displayed for a group of persons who have put on respective pairs of virtual reality glasses from one and the same virtual perspective, which is predefined by the head orientation and/or head position of a specific person. This person, serving as an image generator, can be part of the group, or else not part of the group.

One advantageous embodiment provides for a total available display area of the further pair of virtual reality glasses to be completely utilized for displaying the virtual environment from the first virtual perspective. In that case, the second person thus serves as a co-observer of the displayed environment, wherein the second person acquires an unrestricted picture of the virtual environment from the same perspective as the first person. By virtue of the fact that the total available display area of the further pair of virtual reality glasses is completely utilized for displaying the virtual environment from the first virtual perspective, the second person can recognize the virtual environment and virtual objects arranged therein just as well as the first person by using the first pair of virtual reality glasses that he/she has put on.

A further advantageous embodiment provides for respective head movements of the persons to be detected, wherein the virtual environment displayed from the first virtual perspective by using the further pair of virtual reality glasses is masked out as soon as the detected head movements of the first and further persons differ by greater than a predefined amount. The predefined amount can concern for example accelerations, translational or rotational distances covered or else speeds of movement. Provision is thus made for the virtual environment no longer to be displayed for the second person from the first virtual perspective as soon as the detected head movements of the two persons differ too greatly. This counteracts the problem of the second person becoming nauseous, under certain circumstances, when he/she views the virtual environment from the perspective of the first person but the real movements, in particular the head movements, of the two persons differ greatly. By virtue of the fact that, in this case, the virtual environment is no longer displayed for the second person from the same perspective as for the first person, it is possible to prevent the second person from feeling sick.

In accordance with a further advantageous embodiment, it is provided that as soon as the virtual environment displayed from the first virtual perspective is masked out, the virtual environment is inserted from a further virtual perspective by using the further pair of virtual reality glasses, the further virtual perspective being predefined depending on a detected head position and/or head orientation of the second person. Thus, if the head movements of the two persons differ too greatly, with the result that the virtual environment is no longer displayed for the second person from the same perspective as for the first person, the virtual environment is then displayed for the second person in a manner corresponding to his/her own head movements and/or to his/her own head position. The second person can thus continue to view the virtual environment, although in that case the virtual environment is displayed for the second person in a manner corresponding to his/her own head orientation and/or head positioning.

For example, in this context, provision is made for the virtual environment displayed from the first virtual perspective to be masked out from the outer region toward the center and the virtual environment displayed from the further virtual perspective to be inserted correspondingly. To the extent to which the virtual environment which is displayed from the first virtual perspective decreases in size, the virtual environment which is displayed from the further virtual perspective and is displayed by using the further pair of virtual reality glasses thus increases in size. As soon as certain discrepancies regarding the head movements between the two persons thus occur, the virtual environment is thus still displayed for the second person, but then in accordance with his/her own head positioning and head movements.

In accordance with an alternative advantageous embodiment, provision is made for a total available display area of the further pair of virtual reality glasses to be divided into a first display area and into a second display area, wherein the first display area displays the virtual environment from the first virtual perspective and the second display area displays the virtual environment from a further virtual perspective, which is predefined depending on a detected head position and/or head orientation of the second person. In this alternative example, provision is thus made for the virtual environment and virtual objects arranged therein to be displayed for the second person both from the same virtual perspective as for the first person and from the virtual perspective which corresponds to the person's own head positioning and/or own head movements.

In this context, it is provided that independently of the extent to which respectively detected head movements of the persons differ from one another, the size relationships of the two display areas are maintained and the virtual environment is displayed simultaneously both from the first and from the further virtual perspective in the corresponding display areas. In other words, provision can thus be made for the image of the image generator, that is to say the display of the virtual environment from the first virtual perspective, to be inserted as a kind of small window by using the further pair of virtual reality glasses, wherein the virtual environment is still displayed by using the further pair of virtual reality glasses in accordance with the head positioning and/or head orientation of the second person. By using a kind of split-screen representation, it is thus possible for the second person to view the virtual environment both from the virtual perspective of the first person and in accordance with his/her own head movement and/or head positioning.

In accordance with an alternative advantageous embodiment, provision is made for the further pair of virtual reality glasses to be controlled in such a way that the second display area is chosen to be all the larger, and the first display area correspondingly is chosen to be all the smaller, the greater the extent to which respectively detected head movements of the persons differ from one another. The second person thus likewise sees the virtual environment both from the perspective of the first person and correspondingly from a virtual perspective which is adapted in accordance with his/her own head movements. By virtue of the fact that the second display area, in which the virtual environment is displayed in accordance with the second person's own head movements, is chosen to be all the larger, and correspondingly the first display area, in which the virtual environment is displayed from the virtual perspective of the first person, is chosen to be all the smaller, the greater the extent to which the respectively detected head movements of the persons differ from one another, a particularly good compromise is achieved between the visibility of the virtual environment from the perspective of the first person and the challenge to prevent the second person from feeling sick as a result. For example, the further pair of virtual reality glasses is controlled in such a way that the second display area surrounds the first display area. The less the detected head movements of the two persons differ from one another, the greater the size with which the virtual environment is thus displayed from the first virtual perspective, that is to say as it were from the viewpoint of the first person, centrally by using the pair of virtual reality glasses. The greater the resulting discrepancies regarding the head movements of the persons, the greater the size chosen for the second display area, which surrounds the first display area like a frame, which makes it possible, in a particularly reliable manner, to prevent the second person from becoming nauseous.

The virtual reality system includes a first pair of virtual reality glasses for displaying a virtual environment, a detection device (detector) for detecting a head position and/or head orientation of a first person wearing the pair of virtual reality glasses, and a control device (controller), which is configured to predefine a first virtual perspective depending on the detected head position and/or head orientation of the first person and to control the first pair of virtual reality glasses for displaying the virtual environment from the first virtual perspective. In this case, the virtual reality system is distinguished by the fact that the control device is configured to control a further pair of virtual reality glasses put on by a second person for displaying the virtual environment from the first virtual perspective. Advantageous configurations of the method should be regarded as advantageous configurations of the virtual reality system, wherein the virtual reality system includes features for carrying out the method.

Further advantages, features and details will become apparent from the following description of example embodiments and with reference to the drawings. The features and feature combinations mentioned above in the description and also the features and feature combinations shown below in the description of the drawings and/or in the drawings alone are usable not only in the combination respectively indicated, but also in other combinations or by themselves, without departing from the scope of the disclosure.

BRIEF DESCRIPTION OF THE DRAWINGS

These and other aspects and advantages will become more apparent and more readily appreciated from the following description of the example embodiments, taken in conjunction with the accompanying drawings, of which.

DETAILED DESCRIPTION

Reference will now be made to examples which are illustrated in the accompanying drawings, wherein identical or functionally identical elements have been provided with the same reference signs.

Figure 1:
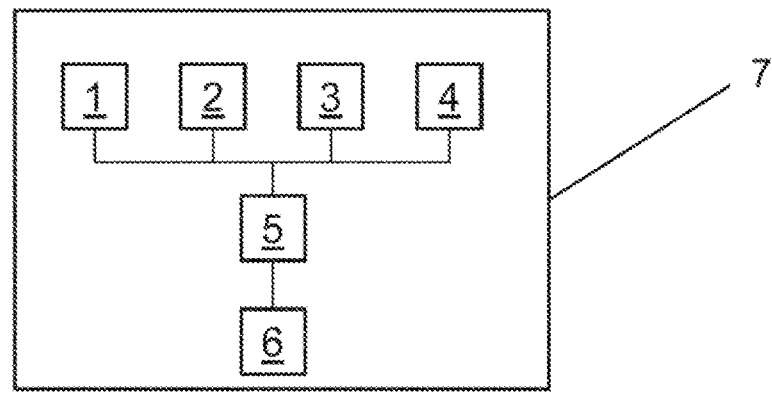
FIG. 1 is a schematic illustration of a virtual reality system including four pairs of virtual reality glasses, a control device for controlling the pairs of virtual reality glasses, and a detection device for detecting the orientation and positioning of the pairs of virtual reality glasses.

A plurality of pairs of virtual reality glasses 1, 2, 3, 4, a control device 5 for controlling the pairs of virtual reality glasses 1, 2, 3, 4, and a detection device 6 for detecting the orientation and positioning of the respective pairs of virtual reality glasses 1, 2, 3, 4 are shown in a schematic illustration in FIG. 1. The pairs of virtual reality glasses 1, 2, 3, 4, the control device 5 and the detection device 6 together form a virtual reality system 7. The virtual reality system 7 can be used to enable a plurality of persons to view a virtual environment, for example in order to support development and design activities in the course of a product development or the like.

Figure 2:
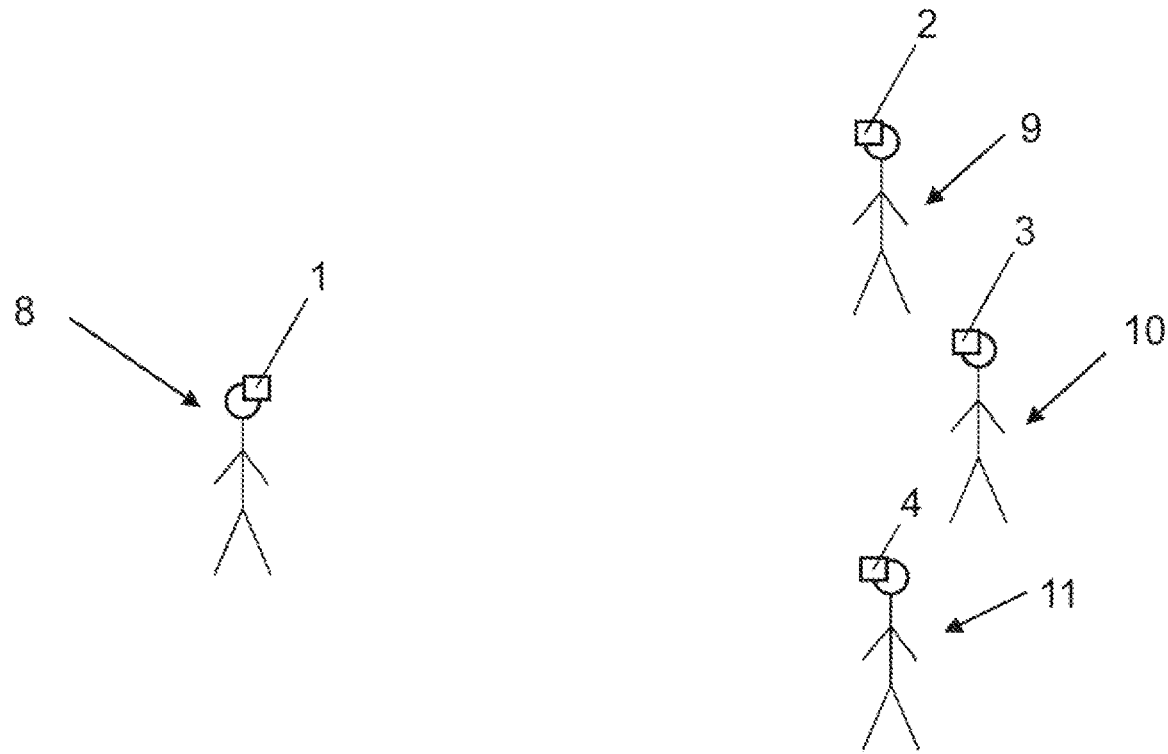
FIG. 2 is a schematic illustration of a group of persons who have put on the pairs of virtual reality glasses.

FIG. 2 illustrates a group of persons 8, 9, 10, 11, wherein the persons 8, 9, 10, 11 have respectively put on one pair of the virtual reality glasses 1, 2, 3, 4. The pairs of virtual reality glasses 1, 2, 3, 4 here respectively cover the complete field of view of the persons 8, 9, 10, 11.

Figure 3:
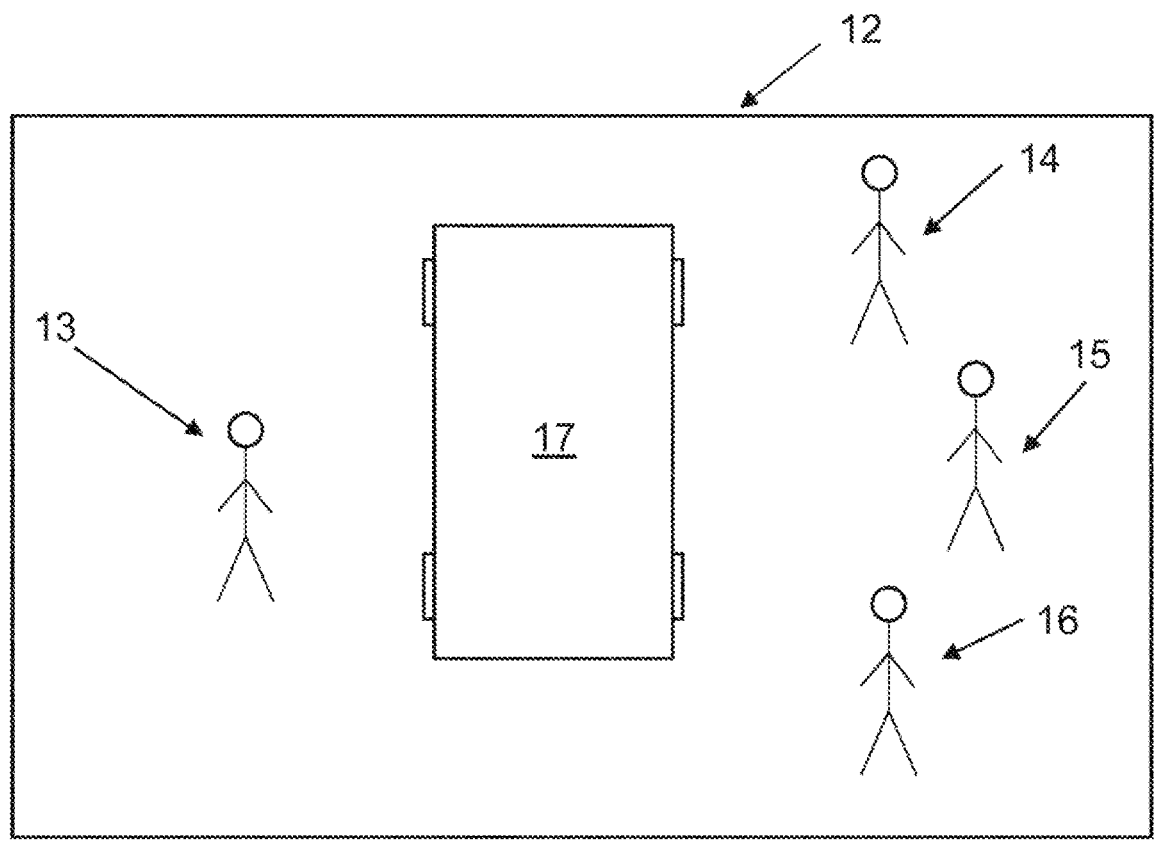
FIG. 3 is a schematic illustration of a virtual motor vehicle arranged within a virtual environment and of avatars which are arranged therein and which are arranged in a manner corresponding to the relative positioning of the persons shown in FIG. 2.

FIG. 3 shows a virtual environment 12, in which a plurality of avatars 13, 14, 15, 16 are arranged. In this case, the arrangement of the avatars 13, 14, 15, 16 corresponds to the relative positioning of the persons 8, 9, 10, 11 wearing the pairs of virtual reality glasses 1, 2, 3, 4, as shown in FIG. 2. In addition, a virtual motor vehicle 17 is arranged as well and can be seen by the persons 8, 9, 10, 11 shown in FIG. 2, in accordance with the orientation and positioning of the avatars, by using the pairs of virtual reality glasses 1, 2, 3, 4 that they have respectively put on.

The virtual reality system 7 can be operated in a first mode, in which the virtual motor vehicle 17 is displayed for the persons 8, 9, 10, 11, by using the pairs of virtual reality glasses 1, 2, 3, 4 that they have respectively put on, from corresponding virtual perspectives corresponding to the respective positioning and movement of the persons 8, 9, 10, 11. Thus, by way of example, if the person 8 moves toward the left in accordance with the illustration in FIG. 2, then the person goes away from the virtual motor vehicle 17. The persons 8, 9, 10, 11 can thus move freely, at least in a specific detection area, within which the detection device 6 can reliably detect the positioning and orientation of the pairs of virtual reality glasses 1, 2, 3, 4, on account of which the respective virtual perspective thereof is correspondingly adapted to the virtual environment 12 displayed by using the pairs of virtual reality glasses 1, 2, 3, 4 and thus also to the motor vehicle 17 displayed.

The virtual reality system 7 can moreover be operated in a further mode, in which the persons 9, 10, 11, by using the pairs of virtual reality glasses 2, 3, 4 that they have put on, view the virtual environment 12 and thus also the virtual motor vehicle 17 from the same virtual perspective as that from which the person 8 views them by using the pair of virtual reality glasses 1 that he/she has put on.

In that case, the control device 5 controls the pairs of virtual reality glasses 2, 3, 4 in such a way that, by using the latter, the virtual environment 12 is displayed from the same virtual perspective as is displayed by using the pair of virtual reality glasses 1. Thus, in accordance with the schematic example in FIG. 3, the persons 9, 10, 11 no longer view the virtual motor vehicle 17 from the right in a manner corresponding to the positioning of the avatars 14, 15, 16, but rather view the virtual motor vehicle 17 from the left exactly like the person 8 in a manner corresponding to the positioning of the avatar 13. As a result, it is possible that the respective persons 8, 9, 10, 11 can allow themselves to be put into the respective viewing perspective of the other persons 8, 9, 10, 11.

However, there is the risk here that those persons 8, 9, 10, 11 for whom the virtual environment 12 is displayed from someone else's perspective will become nauseous under certain circumstances. The risk is all the greater, the greater the discrepancy between respective head movements of the different persons 8, 9, 10, 11.

Figure 4:
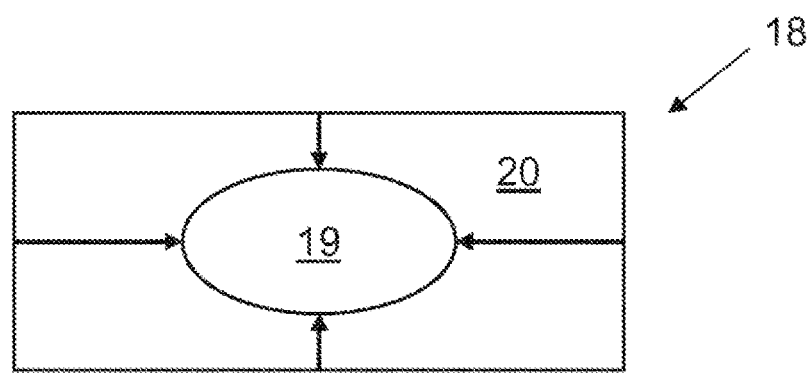
FIG. 4 is a schematic illustration of a display area of one of the pairs of virtual reality glasses, by which the virtual environment is displayed simultaneously from two different virtual perspectives.

FIG. 4 schematically illustrates a display area 18 for one of the pairs of virtual reality glasses 1, 2, 3, 4. In this case, it is possible for the entire available display area 18 to be completely utilized for displaying the virtual environment 12 from someone else's virtual perspective. If the display area 18 belongs to the pair of virtual reality glasses 2 put on by the person 9, for example, then it may be the case that the entire display area 18 is utilized for displaying the virtual environment 12 from the same perspective as by using the pair of virtual reality glasses 1 put on by the person 8. In this case, respective head movements of the persons 8 and 9 are detected, wherein the virtual environment 12 displayed by using the pair of virtual reality glasses 2 from the same virtual perspective as for the person 8 is masked out as soon as the detected head movements of the two persons 8, 9 differ from one another by greater than a predefined amount. By way of example, a specific movement radius can be predefined; in addition, it is also possible to predefine specific acceleration values with regard to the translational and/or rotational head movements. In principle, it is possible to predefine any desired threshold values with regard to the discrepancy between the head movements of the respective persons 8, 9, 10, 11, wherein, in the event of the threshold values being exceeded, the process of being virtually put into the observation perspective of the respective other persons 8, 9, 10, 11 is interrupted or at least changed.

By way of example, it is possible for the virtual environment 12 to be displayed for the person 9 by using his/her pair of virtual reality glasses 2 from his/her own appropriate perspective as soon as the head movements of the persons 8, 9 differ from one another to an excessively great extent. In that case, it is possible, for example, for the entire display area 18 to be used for displaying the virtual environment 12 from that virtual perspective which corresponds to the detected head position and head orientation of the person 9. The virtual environment 12 displayed previously from someone else's perspective can then be masked out for example from the outer region inward and the virtual environment 12 can correspondingly be displayed from the virtual perspective appropriate for the head orientation and head position of the person 9.

Alternatively, it is also possible for the entire display area 18 to be divided into the two display areas 18, 19 identified schematically here. In this case, it can be provided that in the central display area 19, for example, the virtual environment 12 is displayed for the second person 9 throughout from the same virtual perspective as for the person 8, wherein, in the peripheral display area 20, the virtual environment 12 is displayed in a manner corresponding to the actual head orientation and head positioning of the second person 9. In this case, the area ratio of the two display areas 19, 20 can be kept permanently constant, for example.

Alternatively, however, it is also possible for the display area 19 to be chosen to be all the larger, the less the head movements of the persons 9 and 8, for example, differ from one another. By way of example, if the persons 8, 9 keep their head completely still, then the display area 19 is chosen to be particularly large, with the result that the person 9, in a particularly large-area region of the pair of virtual reality glasses 2 that he/she has put on, sees the virtual environment 12 in just the same way as the person 8. By contrast, if there is a large discrepancy between the head movements of the two persons 8, 9, then the display area 19 is reduced in size to a relatively great extent and the peripheral display area 20 is increased in size, with the result that the person 9, by using the pair of virtual reality glasses 2 that he/she has put on, can perceive the virtual environment 12 with a particularly large area in a manner corresponding to his/her own head orientation and head positioning, whereas the perspective from the viewpoint of the person 8 is represented in a particularly small fashion.

By using the virtual reality system 7 explained and the correspondingly described procedure for operating the virtual reality system 7, it is thus possible, on the one hand, in a particularly simple manner, to enable a large number of persons 8, 9, 10, 11 to view a virtual environment 12 from one and the same virtual perspective, wherein, on the other hand, at the same time it is possible to ensure that the persons 8, 9, 10, 11 do not feel sick in the event of excessively large discrepancies regarding their respective head orientations and head movements.

A description has been provided with reference to examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. A method for operating a virtual reality system, comprising:
   displaying a virtual environment from a first virtual perspective by a first pair of virtual reality glasses worn by a first person, the first virtual perspective being predefined based on a detected head position and/or head orientation of the first person;
   displaying the virtual environment by a further pair of virtual reality glasses worn by a second person, the further pair of virtual reality glasses having a total available display area divided into a first display area displaying the virtual environment from the first virtual perspective and a second display area displaying the virtual environment from a further virtual perspective which is predefined based on a detected head position and/or head orientation of the second person; and
   controlling the further pair of virtual reality glasses so that a size of the second display area is increased, and a size of the first display area correspondingly is decreased, as a difference between a detected first head movement of the first person and a detected further head movement of the second person, increases.

2. The method as claimed in claim 1, further comprising controlling the further pair of virtual reality glasses so that the second display area surrounds the first display area.

3. The method as claimed in claim 2, wherein
   the first display area is centrally located within the total available display area, and
   the second display area is located in a peripheral region of the total available display area.

4. The method as claimed in claim 1, further comprising:
   detecting a first head movement of the first person based on at least one of a rotational distance travelled by the head of the first person, a translational distance travelled by the head of the first person, and a speed of movement of the head of the first person;
   detecting a further head movement of the second person based on at least one of a rotational distance travelled by the head of the second person, a translational distance travelled by the head of the second person, and a speed of movement of the head of the second person; and
   determining a difference between the detected first head movement of the first person and the detected further head movement of the second person.

5. The method as claimed in claim 4, further comprising controlling the further pair of virtual reality glasses so that the size of the second display area is decreased and the size of the first display area correspondingly is increased, when the determined difference between the detected first head movement of the first person and the detected further head movement of the second person is less than a previously determined difference between a detected first head movement of the first person and a detected further head movement of the second person.

6. A virtual reality system, comprising
   a first pair of virtual reality glasses configured to display a virtual environment;
   a detector configured to detect a head position and/or head orientation of a first person wearing the first pair of virtual reality glasses; and
   a controller configured
      to predefine a first virtual perspective based on the detected head position and/or head orientation of the first person and to control the first pair of virtual reality glasses to display the virtual environment from the first virtual perspective, to control a further pair of virtual reality glasses worn by a second person to display the virtual environment, the further pair of virtual reality glasses having a total available display area divided into a first display area configured to display the virtual environment from the first virtual perspective and a second display area configured to display the virtual environment from a further virtual perspective which is predefined based on a detected head position and/or head orientation of the second person, and to control the further pair of virtual reality glasses so that a size of the second display area is increased, and a size of the first display area correspondingly is decreased, as a difference between a detected first head movement of the first person and a detected further head movement of the second person, increases.

7. The virtual reality system as claimed in claim 6, wherein the controller is further configured to control the further pair of virtual reality glasses so that the second display area surrounds the first display area.

8. The virtual reality system as claimed in claim 7, wherein the controller is further configured to control the further pair of virtual reality glasses so that the first display area is centrally located within the total available display area, and the second display area is located in a peripheral region of the total available display area.

9. The virtual reality system as claimed in claim 6, wherein
the detector is configured to detect a first head movement of the first person based on at least one of a rotational distance travelled by the head of the first person, a translational distance travelled by the head of the first person, and a speed of movement of the head of the first person, and to detect a further head movement of the second person based on at least one of a rotational distance travelled by the head of the second person, a translational distance travelled by the head of the second person, and a speed of movement of the head of the second person, and
the controller is configured to determine a difference between the detected first head movement of the first person and the detected further head movement of the second person.

10. The virtual reality system as claimed in claim 9, wherein
the controller is further configured to control the further pair of virtual reality glasses so that the size of the second display area is decreased and the size of the first display area correspondingly is increased, when the determined difference between the detected first head movement of the first person and the detected further head movement of the second person is less than a previously determined difference between a detected first head movement of the first person and a detected further head movement of the second person.

* * * * *